(12) United States Patent
Chang et al.

(10) Patent No.: US 7,127,391 B2
(45) Date of Patent: Oct. 24, 2006

(54) METHOD AND APPARATUS FOR SLICE POINT DETERMINATION

(75) Inventors: Charles E. Chang, Thousand Oaks, CA (US); Daniel Scott Draper, Portland, OR (US)

(73) Assignee: Mindspeed Technologies, Inc., Newport Beach, CA (US)

(*) Notice: Subject to any disclaimer, the term of this patent is extended or adjusted under 35 U.S.C. 154(b) by 508 days.

(21) Appl. No.: 10/720,000

(22) Filed: Nov. 20, 2003

(65) Prior Publication Data
US 2005/0114125 A1    May 26, 2005

(51) Int. Cl.
*G10L 21/00* (2006.01)
(52) U.S. Cl. .................... 704/230; 375/316
(58) Field of Classification Search ............. 704/230; 375/316
See application file for complete search history.

(56) References Cited

U.S. PATENT DOCUMENTS 5,896,391 A * 4/1999 Solheim et al. ............. 714/704
6,359,942 B1 * 3/2002 Duggan et al. ............. 375/335
6,735,260 B1 * 5/2004 Eliezer et al. .............. 375/316

* cited by examiner

*Primary Examiner*—Daniel Abebe
(74) *Attorney, Agent, or Firm*—Weide & Miller, Ltd.

(57) ABSTRACT

A method and apparatus is disclosed for reducing the error rate in a received signal by determining and establishing an optimal slice point for a decision device, or optimal operational parameters. In one embodiment, a processor monitors a received signal to determine signal characteristics, such as a peak signal level or phase value. A table look-up operation may occur in a data table or other processing may occur and, based on the signal characteristics, an optimal slice point may be determined. In one embodiment the look-up operation may also reveal one or more optimal operational parameters that, if adopted, will further reduce the error rate. A receiving station may communicate these optimal operational parameters to a transmitting station to modify operation of the transmitting station. Also disclosed is a method and apparatus for self-testing a communication system and channel to determine optimal slice points and operational parameters.

37 Claims, 8 Drawing Sheets

METHOD AND APPARATUS FOR SLICE POINT DETERMINATION

FIELD OF THE INVENTION

The invention relates to communication system and in particular a method and apparatus for optimal slice point determination and control.

RELATED ART

Many modern communication systems employ a decision device as part of a communication receiver's circuitry to quanitze an incoming signal to two or more discrete values. Such decision devices are often referred to as a slicer. As a signal travels through a conductor, such as a fiber optic cable, the signal may be affected by dispersion or intersymbol interference. Similarly, the transmit process itself may alter the signal due to transient effects of the optical signal generator or the driver circuit. As a result the signal received at a receiving station may be different than the signal that is transmitted. This may be referred to as a closing of the eye diagram of the received signal.

Upon being presented with a received signal, the slicer or decision device analyzes the signal in relation to one or more thresholds to determine which discrete value will be output from the slicer, in response to the received signal, at a particular time. The time at which the slicer analyzes the signal and makes a characterization of the signal to one of the discrete values may be referred to as a slice time.

As is commonly understood, the slicer may compare the incoming signals to one or more threshold values. Based on this comparison to the one or more threshold values, such as whether the magnitude of the received signal is greater than or less than a threshold value, the slicer determines which discrete value to output as representative of the received signal at the particular slice time. The term slice point may be used to describe or characterize the one or more threshold values or other aspects of slicer operation. In this manner an analog signal or optical signal may be received and the originally transmitted signal recovered at the receiver.

Use of prior art decision devices, such as a prior art slicer, is not however, without drawbacks. As can be understood, the comparison to the one or more threshold value determines to which discrete value the received signal is quantized at each slice point. In prior art systems incorrect or undesirable threshold value settings often lead to an incorrect decision by the slicer which in turn results in the received signal being quantized to an incorrect value. This undesirably increases the bit error rate (BER), which in turn leads to corrupt data or forces retransmission that reduces the overall data rate.

As a further drawback of prior art systems, the magnitude of the threshold value is set at the time of manufacture and thus held static over time. For example, the peak magnitude or value of the received signal may change over time or be dependant upon the particular installation configuration, such as the length of the line. As a result, the threshold is not properly calibrated with the communication system or fixed at the time of manufacture leads to undesirably high BER rates. Moreover, prior art system do not adequately take into account the various factors that effect the dynamic interaction between the one or more threshold values and the parameters that alter the threshold values, which as a composite determine the optimal slice point. Failure to account for all such parameters leads to an undesirably high BER.

The method and apparatus described below overcome the drawbacks of the prior art by providing a method and apparatus for optimal slice point determination and control.

SUMMARY

The method and apparatus described herein provides an efficient and economical solution for optimal slice point determination and control, thereby overcoming the drawbacks of prior art decision device systems. In one exemplary embodiment, the communication device is equipped with a processor that is configured to monitor one or more aspects of a received signal to determine one or more characteristics of the received signal. Based on the monitoring, the processor executes equations or performs a look-up operation in a data table to obtain optimal slice point data.

The term slice point may be used to describe or characterize the one or more threshold values or other aspects of slicer operation. The term slice time is defined to mean a particular point in time when the decision device operates on the received signal to quantize the received signal to a particular discrete value. Stated another way, the slice time is the point in time when the slicer, or other decision device, compares the received signal to one or more threshold values.

In one embodiment, the optimal slice point data, determined as part of the look-up operation or the processor calculations, is forwarded to a decision device that is associated with or located in the communication device, and the slice points are adjusted accordingly. Utilizing real time or intermittent adjustment of the slice point, the BER may be minimized.

In one embodiment, a processor in the communication device may be further configured to communicate with the transmitter to thereby establish operational parameters that minimize the BER. For example, the peak amplitude and/or phase alignment of a received signal may be monitored and processed in conjunction with information stored in the data table to arrive at optimal operational parameters for the communication system, such as for example, the one or more transceivers. The term operational parameters is defined to mean one or more settings, status, methods of operations, or configurations of the communication system, i.e., either the transmitter, the receiver, or both. These optimal operational parameters may be provided to the one or more transceivers in the communication system to establish operation in a manner that minimizes the BER.

In one embodiment, a self test module (STM) is employed with the communication device to enable transmission, reception and processing of test signals. During the test signal transmission, one or more aspects of the test signal transmission may be varied while the slice points and slice times are likewise varied to create resulting test data corresponding to the actual installed communication system. For example, an optimal slice point may be determined for a particular sample point, where the sample point comprises a set of one or more threshold values. Thus, the test data may be processed to identify operational parameters and slice points that minimize the BER, yield cost savings or extend the operational life of the communication device components.

In one embodiment, a method for reducing the bit error rate during reception and processing of a received signal is provided. The method comprises the steps of receiving, at a receiver, a signal from a remote location and analyzing the received signal to determine one or more signal characteristics of the received signal. Thereafter, this method performs a look-up in a look-up table based on the one or more signal characteristics to determine an optimal slice point and retrieves this optimal slice point data from the look-up. Finally, the method provides the optimal slice point data to a decision device that is part of the receiver to establish the optimal slice point as the decision device slice point, and processes the received signal with the decision device utilizing the optimal slice point.

In a variation of this method of operation, the one or more signal characteristics may comprise a signal magnitude characteristic or a signal phase characteristic. It is contemplated that the look-up table may be generated during prior test routines to determine optimal slice points. In one embodiment, the slice point comprises one or more threshold values that are utilized by the decision device. The relation between one or more signal characteristics and the optimal slice point may be non-linear.

Also disclosed is a method for quantizing a received signal to two or more discrete values comprising the steps of monitoring a received signal to determine a peak value and phase value of the received signal and processing the peak value and phase value of the received signal based on prior testing to determine an optimal slice point. The optimal slice point is communicated to a decision device, and the slice point of the decision device is set as the optimal slice point. Thereafter, the method analyzes the received signal with the decision device by comparing the received signal to the optimal slice point and, based on the comparison, quantizing the received signal to one of two or more discrete values.

In one embodiment, the processing comprises performing a look-up operation in a memory. It is further contemplated that comparing the received signal to the optimal slice point may comprise comparing the magnitude of the received signal at a slice time to a threshold value defined by the optimal slice point. In one embodiment, the processing comprises executing machine readable code to compare the peak value and phase value to one or more values in memory to obtain an optimal slice point.

A system for setting a slice point of a decision device in a transceiver is also disclosed. It comprises an amplifier configured to modify a received signal's power level and output received signal strength indicator data representing the magnitude of the received signal. A clock and data recovery module is included and configured to output phase alignment data regarding the received signal. A memory is configured to store test data such that the test data comprises optimal slice point data for two or more sets of signal strength indicator data and phase alignment data. Also part of this system is a processor, in communication with the memory that is configured to receive and utilize the signal strength indicator data and phase alignment data of the received signal to perform a look-up operation in the test data to determine an optimal slice point setting. Finally, a decision device, in communication with the processor, is provided and configured to receive the optimal slice point setting and adjust one or more decision device threshold values based on the optimal slice point setting.

In one embodiment, the amplifier comprises a limiting amplifier. It is contemplated that the optimal slice point data may comprise at least a voltage threshold value. Furthermore, the test data may comprise data that was generated prior to the look-up operation, and the test data associates an optimal slice point with a received signal strength value and a phase alignment value. In some situations, the relation between the optimal slice point is not linearly related to the received signal strength.

Also disclosed is a method for controlling settings in another device. One method of operation comprises a method for controlling operation of one or more transceivers to reduce the bit error rate when processing a received signal. This method comprises receiving, at a receiver at a first station, a signal transmitted from a transmitter of a second station and analyzing the signal to determine one or more signal parameters. Thereafter, the method provides the one or more signal parameters to a processor and compares the one or more signal parameters to optimal operational parameter data stored in a memory. Next, and responsive to the comparing, the method selects one or more optimal operational parameter settings and transmits at least one optimal operational parameter setting from the first station to the second station to control at least one aspect of operation of the transmitter at the second station. Finally, the method continues to receive and process the signal so that the signal being transmitted is based on the optimal operational parameter settings, wherein the optimal operational parameter settings are selected to reduce the bit error rate during processing of the received signal.

The method may further comprise communicating at least one optimal operational parameter setting to the receiver at the first station to control at least one aspect of processing the signal by the receiver at the first station. In addition, the transmitting at least one optimal operational parameter setting to the second station may comprise transmitting an optimal transmit power level.

To aid in the determination of an optimal slice point, a method for built in self test (BIST) is disclosed. In one embodiment, this method comprises providing a communication system having a receiver at a first station and a transmitter at a second station. These devices initiate a test routine to determine one or more optimal slice points for a decision device located in the receiver of the first station. This test routine may comprise generating or retrieving from memory test data and transmitting the test data from the second station to the first station. Next, the method monitors the received signal to determine one or more received signal parameters, and concurrent with transmitting the test data and monitoring the received signal, varies the slice point and monitors the bit error rate to determine at least one optimal slice point. During this time, the method records at least one optimal slice point for one or more permutations of transmit operational parameters and received signal parameters in a memory and sets the optimal slice point and optimal transmit operational parameters.

This BIST operation may also determine and/or vary one or more transmit operational parameters of the second station. The step of setting the optimal transmit operational parameters may comprise transmitting a control signal from the first station to the second station to thereby control the transmit power at the second station. This method may also include the steps of initiating a communication session between the first station and the second station to thereby receive a signal from the second station and analyzing the signal to determine one or more received signal parameters. Based on these received signal parameters, the method may perform a look-up operation in the memory to obtain an optimal slice point for the one or more received signal parameters and communicate the optimal slice point to a decision device. The system may also process the received signal utilizing the optimal slice point for future processing by the decision device.

In one embodiment the test routine is performed by a processor. It is contemplated that the optimal slice point may be dependant on the magnitude of the received signal and the one or more permutations of transmit operational parameters include varying the transmit power to thereby vary the magnitude of the received signal. In one embodiment, the slice point is defined by a time value, a threshold voltage value, and a phase value. The step of setting the optimal transmit operational parameters may comprise transmitting a control signal from the first station to the second station to thereby control the transmit power at the second station.

As a result of the methods and apparatus described herein a system for evaluating an installed communication link and establishing a optimal slice point based on the evaluation of the installed communication link is also contemplated. Such a system may comprise a first station and a second station. The first station may comprise a driver circuit configured to establish a transmit power level based on a power level control signal and a first station processor configured to communicate with a second station and the driver circuit to thereby provide a power level control signal to the driver circuit. The second station may comprise a signal magnitude detector configured to generate data regarding a magnitude level of a received signal and a decision device configured to quantize a received signal to one of two or more discrete values based on a slice point. Also part of the second station may be a memory configured to store machine readable code and a second station processor configured to communicate with the first station, the decision device, and the signal peak detector to thereby control a slice point of the decision device and the transmit power level at the first station. The processor may be further configured to execute the machine readable code stored in the memory. The machine readable code may be configured to initiate a test routine that generates test data defining optimal slice points.

In this system, the test data may be generated by monitoring the error rate of the received signal during processing while varying the transmit power level and the slice point. It is contemplated that the machine readable code may be further configured to set the optimal slice point of the decision device based on the test data to thereby minimize the error rate when processing a received signal.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principals of the invention. Moreover, in the figures, like reference numerals designate corresponding parts throughout the different views.

DETAILED DESCRIPTION

Figure 1:
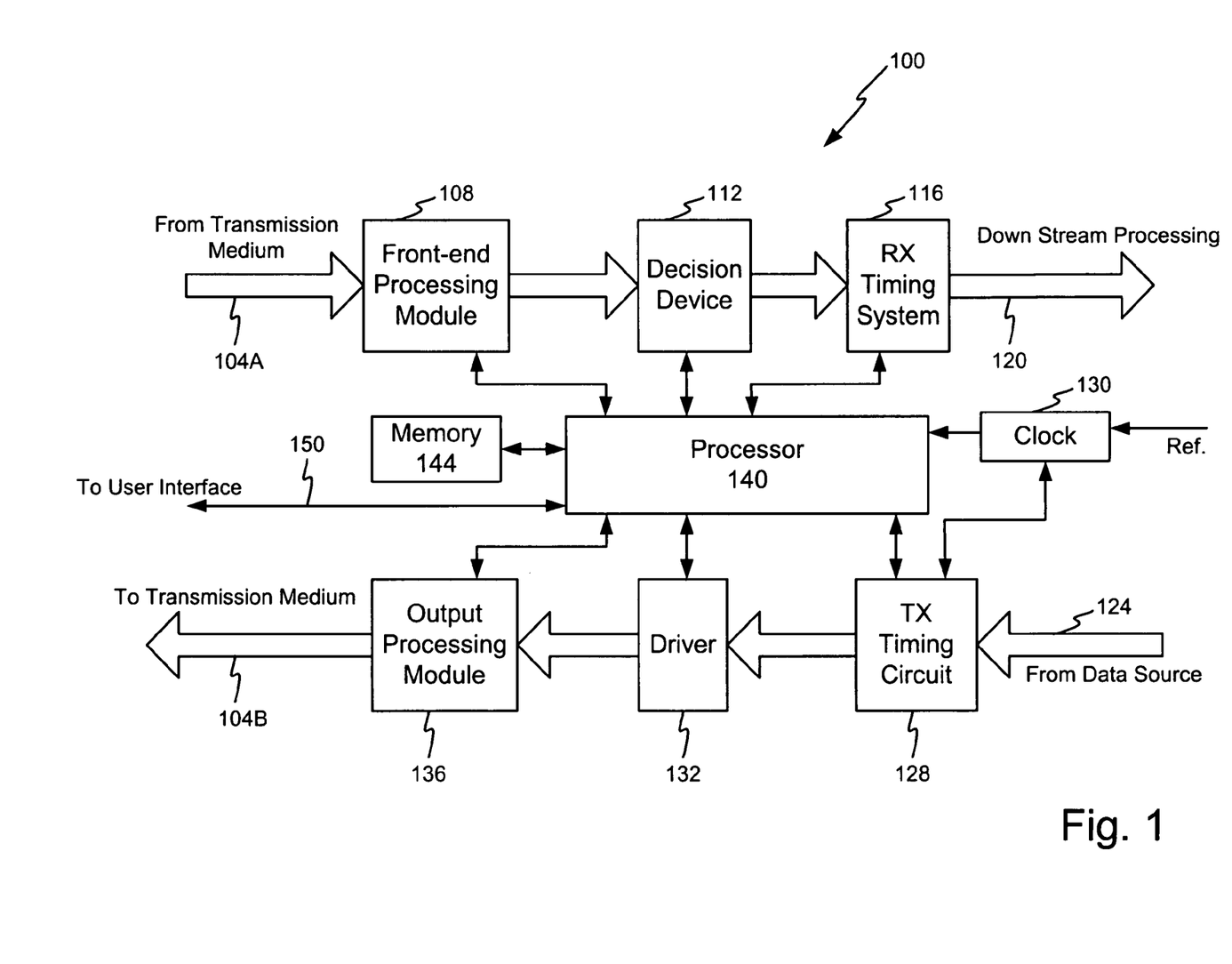
FIG. 1 illustrates a block diagram of an example embodiment of a slice point control system.

FIG. 1 illustrates a block diagram of an example embodiment of a slice point control system. The slice point may vary in time, magnitude, phase or some other parameter. In one embodiment the slice point lies within an eye diagram and is selected to minimize the BER. As shown in FIG. 1, a transceiver 100 is shown connected to a transmission medium 104A, 104B. The transmission medium may comprises any type conductor or free space medium including but not limited to fiber optic cable, fiber optics, one or more twisted pair conductor, coaxial cable, wireless or optical medium, any metallic conductor, or any other channel or conductor. The mediums 104A and 104B may comprise separate paths or a common path used for both incoming and outgoing data.

The transmission medium 104A connects to a front-end processing module 108 that is configured to process the incoming signal to perform tasks such as, but not limited to, amplification, filtering, and noise reductions. It is also contemplated that equalization may occur at this stage. The output of the front-end processing module 108 connects to a decision device 112 that is configured to compare the received signal at designated times to one or more threshold values. In one embodiment the decision device 112 comprises a slicer. These threshold values and the designated times may be referred to collectively as a slice points, which occurs at particular slice times. Thus at a slice time the decision device 112 compares the signal to one or more threshold values to there by quantize the received signal to one or more discrete values. The output of the decision device 112 feeds into a receiver timing system 116 which may align or multiplex the signal into a path 120 for down stream processing. The output path 120 may comprise a parallel format path or serial format path.

The outgoing data path in the transceiver 100 comprises a path 124 configured to provide data or a signal from a data source (not shown) that connects to a transmitter timing circuit 128. The timing circuit 128, which also receives input from a clock 130 oversees timing and phase alignment of the outgoing signal. The clock may receive a reference signal as shown. A driver 132 receives the signal from the timing circuit 128 and processes the signal in preparation for transmission by the output processing module 136. In one embodiment the driver 132 comprises an amplifier configured to power or provide a driver signal to a light emitting device such as a laser, light emitting diode, other semiconductor device, or any other light emitting device. It also contemplated that the driver and output processing may transmit the signal in electrical form over an electrical conductor thereby eliminating the conversion of the signal to an optical signal. The output processing module 136 connects to the transmission medium 104B as shown.

A processor 140 connects to the front-end processing module 108, the decision device 112, and the receiver timing system 116 and may be configured to control the slice point of the decision device and the phase alignment of the receiver timing system. It is further contemplated that the processor may also control or execute operation subsequent receiver processing. Thus, it is contemplated that the processor 140 may control the operational parameters of the front-end processing module 108, the decision device 112, and the receiver timing system 116.

The processor 140 also connects to the output processing module 136, the driver 132 and the transmitter timing circuit 128. These connections allow the processor 140 to control the operational parameters of the output processing module 136, driver 132 and timing circuit 128.

The processor 140 also connects to a user interface (not shown) via interface line 150 to allow input from and adjustment, input, and output by a user, control system or device. A memory 144 connects to the processor 140 so that the processor may access machine readable code, equations, or data tables which may be stored in memory or the processor. Likewise, it is contemplated that the user interface may also access the memory 144 directly or via the processor 140. Accordingly, it is contemplate that the processor 140 may be configured to execute and be compatible with machine readable code that is stored in the memory 144, on the processor or accessible via the user interface line 150. The machine readable code may comprise any type software code, data or binary information capable of being executed by the processor to generate an effect on the communication device, or to generate data to one or more transceivers to control one or more aspects of operation, such as the slice point, slice time, or operational parameters of a communication device.

Operation of the system shown in FIG. 1 is discussed below in more detail. Further more, FIG. 1 is an example embodiment and the claims that follow should not be interpreted as being limited to this particular embodiment.

Figure 2:
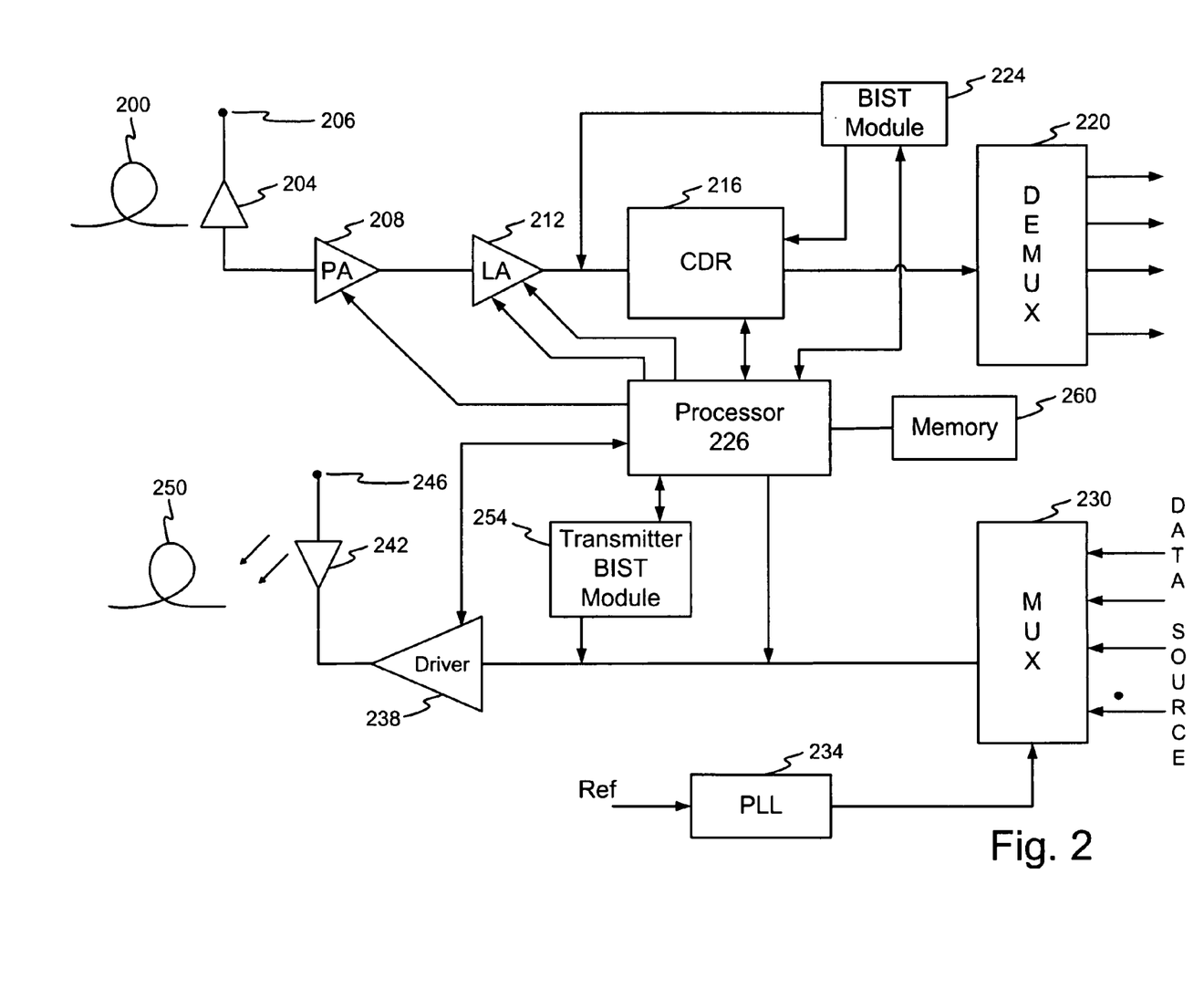
FIG. 2 illustrates a block diagram of an example implementation of a slice point control system.

FIG. 2 illustrates a block diagram of an exemplary implementation of a transceiver configured according to the method and apparatus disclosed herein. It should be understood that this example implementation is shown for purposes of understanding and as such the claims which follow should not be interpreted as being limited to this particular embodiment. As shown, the output of a fiber optic cable 200 is positioned adjacent to a photo detector 204 with proper biasing 206. The photo detector 204 receives and transforms the light energy to an electrical signal, which is in turn provided to a pre-amplifier 208 and a limiting amplifier 212. The limiting amplifier 212 serves in this example implementation as a slicer while the pre-amplifier establishes the low power signal from the photo detector 204 to a suitable power level for processing. The output of the limiting amplifier 208 feeds into a clock data recovery (CDR) circuit 216 and the output of the CDR 216 feeds into a de-multiplexer 220. The CDR 216 oversees signal and clock timing issues while the de-multiplexer 220 operates as would be understood in the art. In one embodiment the CDR 216 possesses a phase adjust capability to thereby control the phase point when the received signal is sliced and the phase of the received signal in general.

A processor 226 is in communication with the pre-amplifier 208, limiting amplifier 212 and the CDR 216. The processor 226 may monitor or obtain feedback regarding a received signal strength indicator (RSSI) from the pre-amplifier 208 and/or the limiting amplifier 212. The RSSI provides information regarding the strength or magnitude of a received signal. The functionality of these components and the interconnections is described below in more detail. A receiver built in self test (BIST) module 224 may optionally be configured as shown by connecting the BIST module to the CDR 216 and the incoming signal line, or the functionality of the BIST module may be enabled by a processor. The BIST module 224 is discussed below in more detail.

The processor 226 connects to the pre-amplifier 208, the limiting amplifier 212, and the CDR circuit 216. Although not shown it is contemplated that the processor 226 may also connect to the BIST module 224 to control or initiation operation of the BIST module. The processor 226 may comprises any type of processor capable of realizing the functionality described herein. The processor 226 may comprise a microprocessor, a controller, ASIC, or any other type processing device.

The outgoing path of the transceiver shown near the bottom of FIG. 2 comprises a multiplexer 230 configured to receive input from a data source not shown. In this example embodiment the input arrives in parallel format and the multiplexer converts the input to a serial format. A phase lock loop 234 provides input to the multiplexer to achieve proper timing and signal alignment. In one embodiment the phase lock loop 234 generates a clock signal. The multiplexer output is provided to an optical driver 238. The driver 238 amplifies the signal to a power level suitable to drive a light emitting device 242 which is biased 246 as desired. The light emitting device 242 generates an optical signal for transmission on to one or more optical fibers 250. It is further contemplated that a circulator (not shown) may also be utilized to achieve bi-directional communication over a single fiber. Any type of light emitting device 242 may be utilized and any type optic fiber 250, 200 may be utilized. A transmitter BIST module 254 is capable of communication with the processor 226, the outgoing transmission line, and one or more other devices in the outgoing signal path. The BIST module 254 is discussed below in more detail.

The processor 226 connects to the driver 238, the transmitter BIST module 254 and the conductor between the MUX 230 and the driver to optionally control operation of one or more of these devices or provide data to the conductor as is described below in more detail. Memory 260 may optionally connect to the processor 226. Operation of the system of FIG. 2 is discussed below in more detail.

Figure 3:
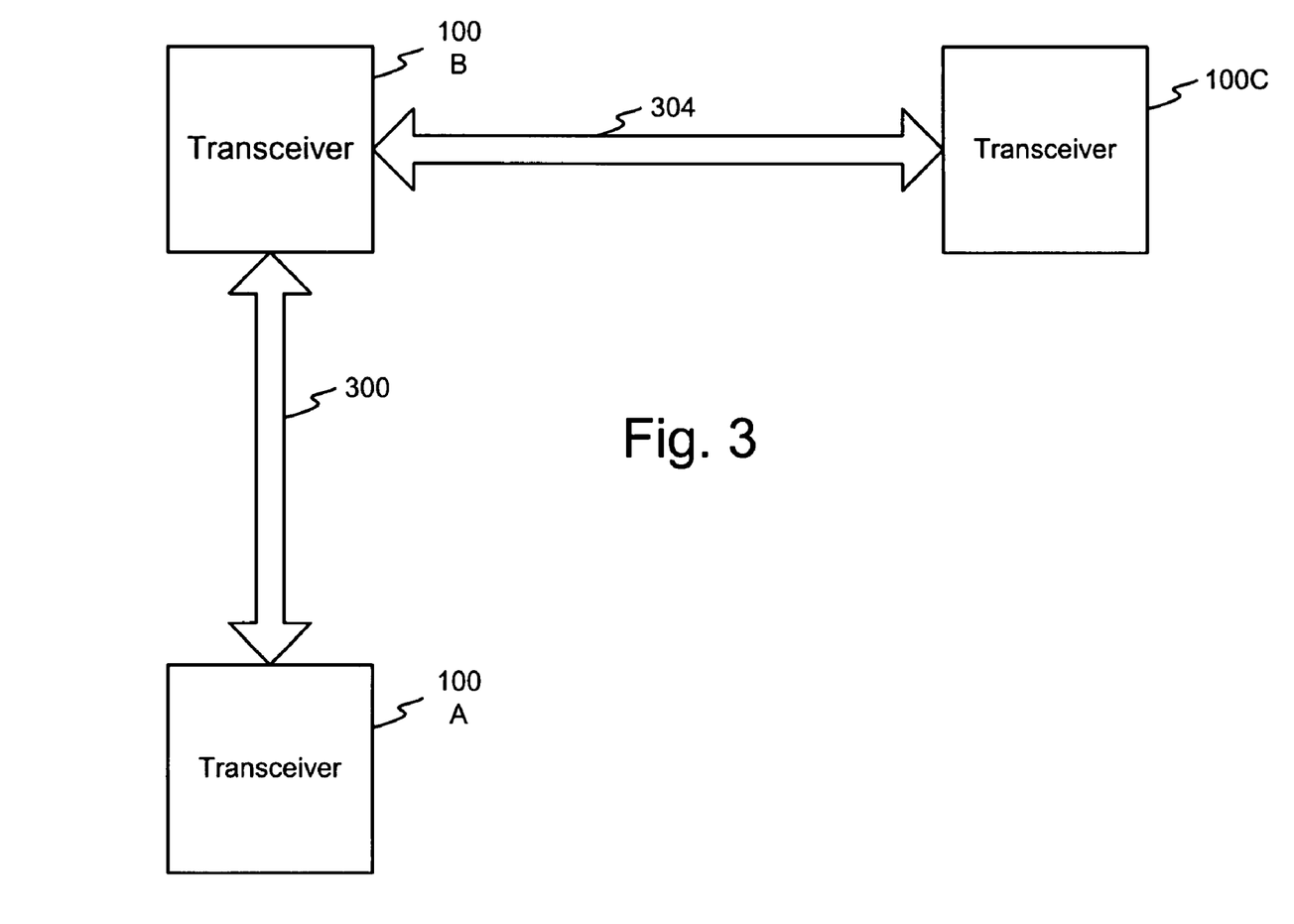
FIG. 3 illustrates a block diagram of a multi-transceiver communication system.

FIG. 3 illustrates a block diagram of multi-transceiver system. It is contemplated that the transceiver system shown in FIG. 1 or 2 may be configured as part of a multi-transceiver system. As shown, a transceiver 100A, 100B, and 100C are interconnected by transmission mediums 300 and 304. It is contemplated that transceiver 100B may be part of a communication node or a repeater. It is contemplated that the transceivers 100 may communicate with each other and in particular in one embodiment the processor with each transceiver may communicate with other transceivers to control the operational parameters of the other transceivers and to implement test routines that generates data that reduces the BER. In one embodiment a low frequency signally protocol may be utilized to communicate optimal operational parameters or optimal slice point settings between transceivers. In one embodiment one or more modules control the calculation and setting of slice points. Standard communication methods may be utilized during periods when the transmission medium is being used for customer traffic while during periods of customer traffic low frequency or other type communication, which does not interfere with customer traffic, may occur.

Figure 4:
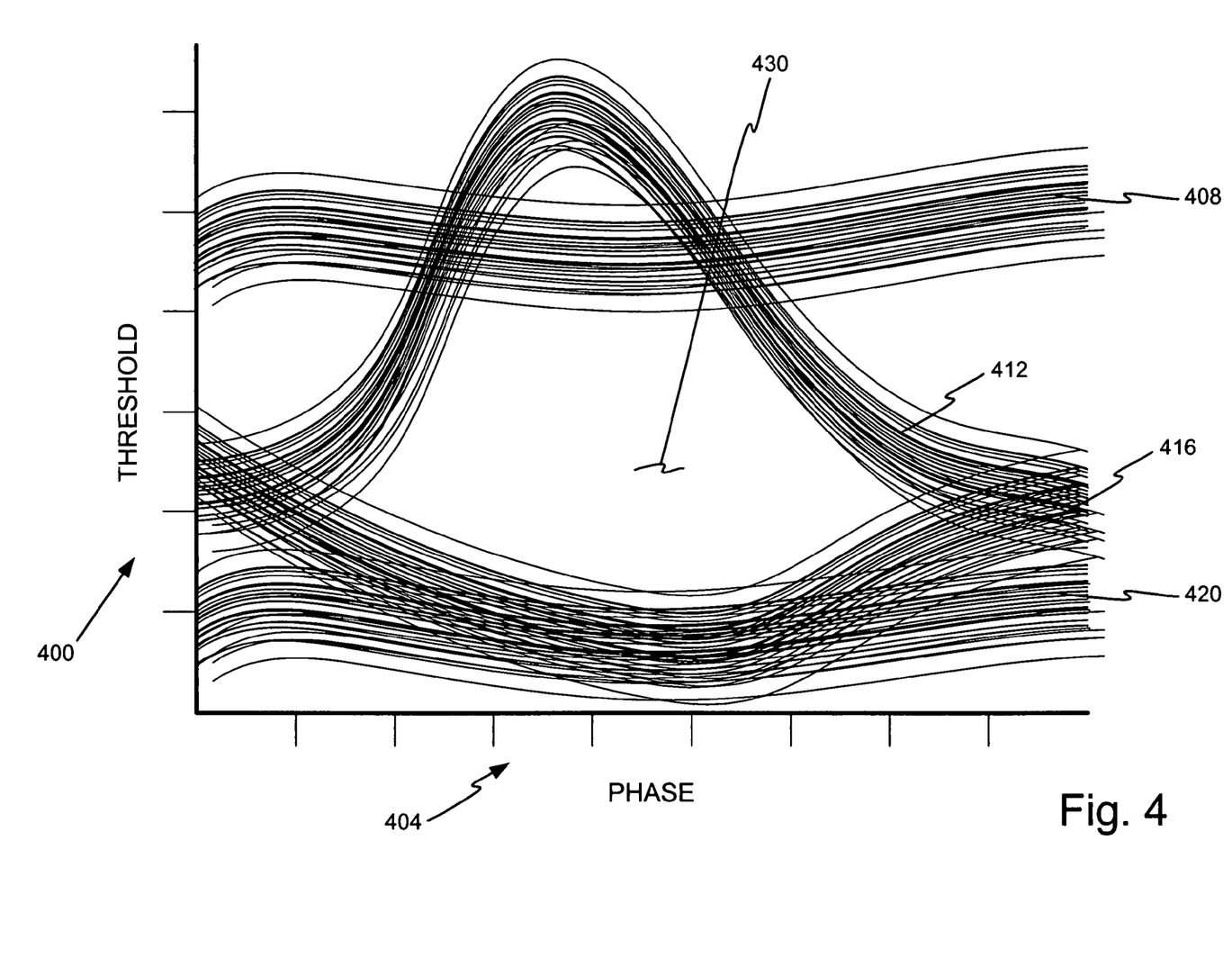
FIG. 4 illustrates a plot of an eye diagram as may be generated to determine an optimal slice point.

FIG. 4 illustrates a plot of an eye diagram as may be generated to determine an optimal slice point. As shown, a vertical axis represents voltage magnitude and may be considered as a threshold when considered in relation of slice point determination. The horizontal axis represents phase or in some aspects time. The plots 408–420 represent signals received after transmission through a channel. The Signal plots are overlaid in time to illustrate that over time, a received signal wanders in magnitude and phase. Such variations in magnitude and phase may result in slice errors when quantizing the signal to one of two or more discrete values. It is desired to set the slice point at a location of the eye diagram 430 that minimizes the BER. By controlling the slice point and other operational parameters of the receiver or transmitter the BER may be reduced.

In one embodiment, testing may be performed and data generated in the lab which may be later utilized to determine the optimal slice point based on information collected regarding the operation of the communication system or the received signal. In one embodiment the magnitude threshold and a phase point or phase threshold determine a slice point. It is contemplated that in the lab a first and second transceiver may be provided and connected by a conductor, such a fiber optic cable. As part of the data development process a signal is transmitted between a first transceiver and the second transceiver while monitoring the BER and varying one or more parameters of operation. Through use of a processor numerous test signals may be generated while varying one or more aspects of operation of the transceivers to determine which combinations, i.e. operational parameters, generate the lowest BER. As can be seen from the eye diagram of FIG. 4, the ideal slice point, within the eye diagram, may not vary linearly with changes in the signal magnitude or phase.

In one example method of generating test data, a signal is transmitted at a constant magnitude while the system varies the transmit phase to vary the phase alignment of received signal. During this operation the slice point is varied, for each transmit phase setting, and the BER is monitored and recorded for each variation in slice point. Thereafter, the transmit power may be varied during transmission of a test signal. During this operation the slice point may be varied and the BER monitored and recorded for each variation in slice point. In this manner one or more of the operational parameters of the communication system may be varied while also varying the slice point and monitoring the BER. Additional variations to the operational parameters may be made as would be understood by one of ordinary skill in the art based on this disclosure. Optimal slice point settings may be established, that minimize the BER, for all permutations of operational parameters. It is fully contemplated that any parameter that may vary or that may be varied in an installed system may also be varied in the lab to generate different operational parameters and optimal slice points. Aspects that may be modified in the lab or in an installed system to generate optimal slice point data comprise varying transmission medium length, type of transmission length, termination method, driver, optical detector, light signal generator, age of fiber, type of fiber, curvature of fiber, temperature, transmit power, type of modulation, type of modulator, age of modulator. Operational parameters that may be varied include, but are not limited to, slice point voltage magnitude, slice point phase alignment, transmit power, transmit phase, modulation, bias, modulation percentage control, duty cycle control, or input compensation. It is contemplated that one or more of these may be under processor control. The term processor should be interpreted broadly to mean any type of control device or control logic.

From this test data the testing process may generate a test data table based on BER levels at each slice point. Alternatively, the test data may be utilized to generate equations representative of relation between BER level and optimal slice points for various operational parameters. The test data or the equations or both may then be stored in communication systems, such as the processor or the memory. The test data and the equations would then be available when the communication equipment is installed. As a result, this data is available via the processor or other means to determine the optimal slice point based on various operational parameters of the transceiver or communication system. Additionally the operational parameters of the transceiver(s) may be modified. It is further contemplated that new data may be downloaded to a transceiver at a later date as test data or equations are refined, revise, or updated. This download may occur via the user interface line.

Figure 5:
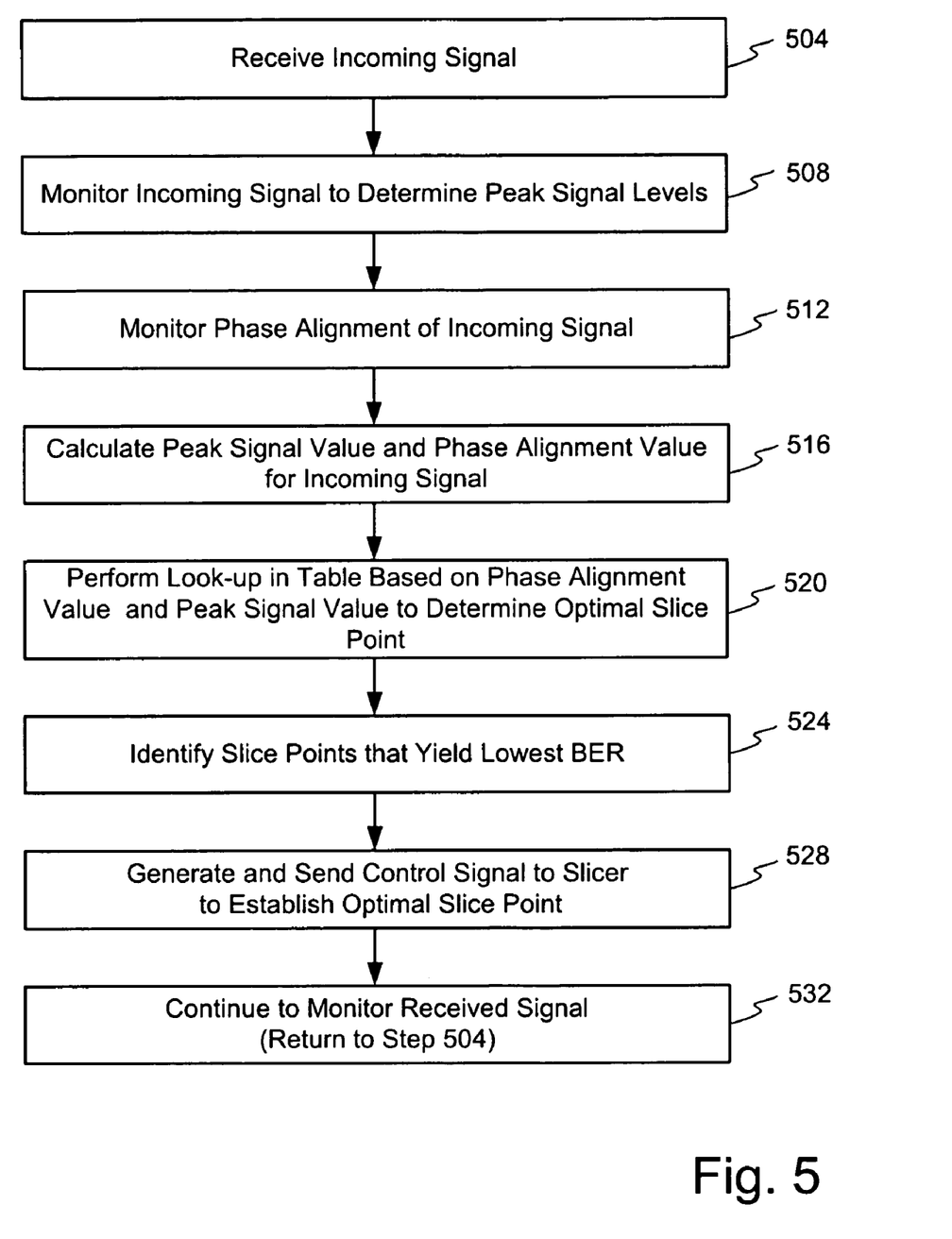
FIG. 5 illustrates an operational flow diagram of an example method of optimal slice point determination and operation.

FIG. 5 illustrates an operational flow diagram of an example method of optimal slice point determination and operation. This exemplary method of operation monitors one more characteristic of the received signal and based on such characteristics utilizes the data table or one or more equations to determine an optimal slice point. At a step 504 a receiver in a communication system receives an incoming signal and at step 508 monitors the incoming signal to determine an aspect of the magnitude of the signal, such as for example, the peak signal level. Thereafter at step 512 the receiver monitors the phase alignment of the incoming signal. It is contemplated that a processor, configured as part of the transceiver, may be utilized to monitor the received signal and for other processing and control functions as described herein.

At a step 516 the processor calculates or determines a peak signal value and a phase alignment value for the incoming signal. Based on these values a look-up operation in the data table may be performed by the processor. This occurs at step 520. At step 524 the look-up operation identifies an optimal slice point level. It is also contemplated that one or more equations or other type processing may occur to obtain the desired information. In one embodiment the optimal slice point level comprises a slice point that minimizes the BER. Other optimal slice points may be defined that are based on optimization other than minimizing the BER. For example an optimal slice point may minimize power usage. Alternatively, these monitored values may be utilized in conjunction with one or more equations that are engineered to determine an optimal slice points. Hence, through processor execution of the equations the processor may determine an optimal slice point.

At a step 528 the processor retrieves or generates the optimal slice point and sends one or more control signals to a decision devices, such as slicer, or other receiver apparatus to thereby set the slice point to the optimal level. Thereafter, at step 532 operation continues utilizing the optimal slice point and the processor or other apparatus continues to monitor the received signal, such as by returning to step 504.

It is contemplated that as an advantage over systems of the prior art the method and apparatus described herein is able to account for a non-linear relationship between the monitored data, regarding the received signal, and the optimal slice point. As a result, such monitoring and comparison to pre-stored data excels over a system utilizing or assuming a linear relationship between the received signal and the optimal slice point. Failure to adjust the slice point or failure to adjust the slice point accurately, such as by assuming a linear relationship, yields inaccurate results and will increase the BER instead of reducing the BER. The optimal slice point may not be in linear relationship to the magnitude of the received signal and hence, systems that attempt to implement a linear slice point adjustment mechanism may yield undesired performance. For example, a 10% increase in the magnitude of the received signal may not require a linear, i.e. 10%, increase in the voltage threshold for the slice point. Similarly, it is contemplated that two or more operational parameters may be monitored and hence the relationship between received signal peak value and phase alignment is not linearly related to sample point. Thus, it may be necessary to adjust both the voltage threshold and the phase point of the slice point based on monitoring of the received signal.

In some systems the optimal phase may vary as a function of transmit power. In one embodiment, this is enabled in a closed loop system. In one embodiment, a feedback loop is enabled to optimize the slice point.

Figure 6A:
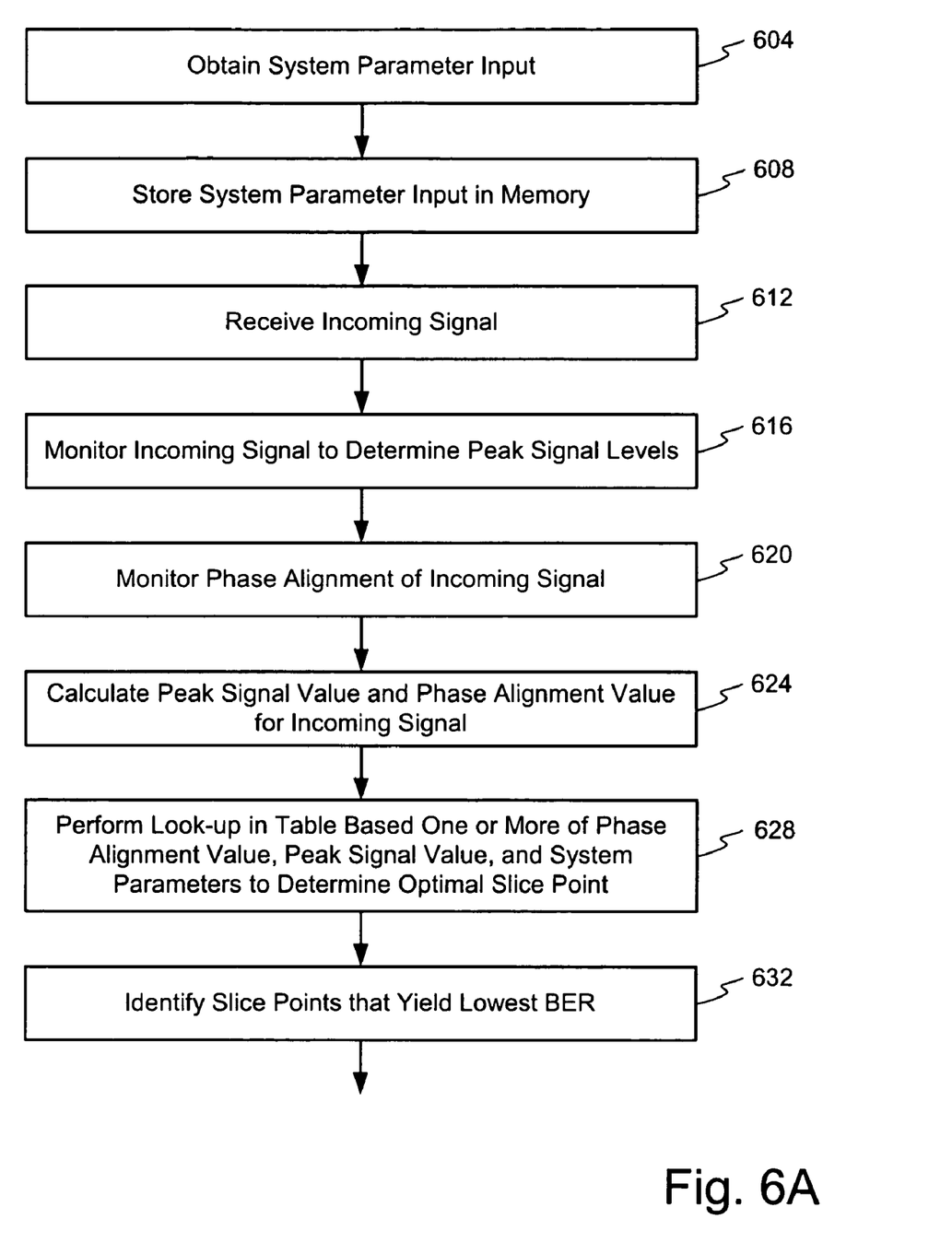
FIGS. 6A and 6B illustrate an operational flow diagram of an example method of operational parameter manipulation to optimize performance.
Figure 6B:
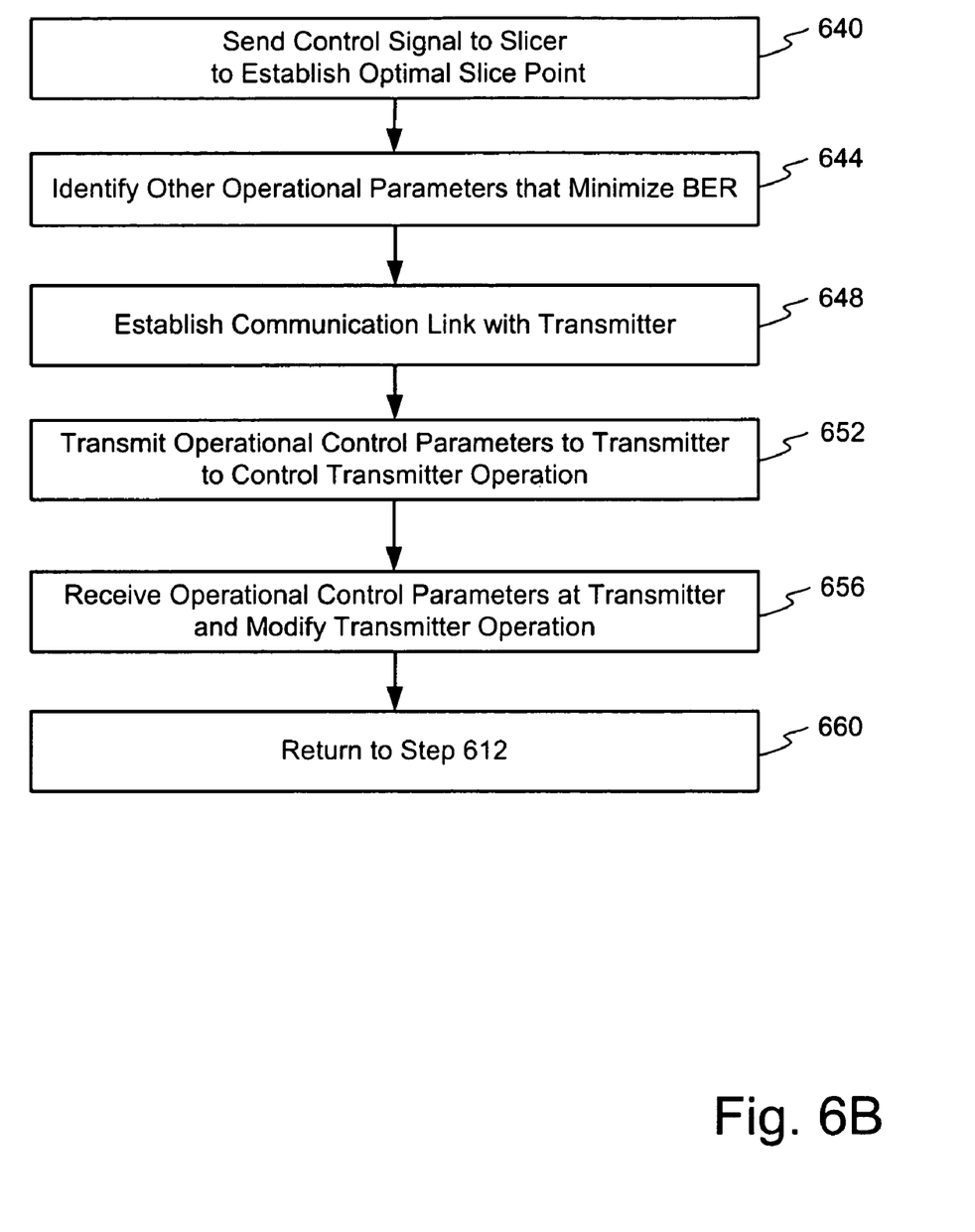

FIG. 6 illustrates an operational flow diagram of an example method of operational parameter manipulation to optimize performance. It is further contemplated that in addition to monitoring one or more aspects of the received signal, other or additional aspects of system operation may be monitored or controlled to reduce the BER or otherwise optimize performance. The processor that is integrated into one or more of the transceivers may be utilized to control operation of one or more devices in the receiving transceiver or communicate to or with the transmitting transceiver to effect a change in operation or a change in the operational parameters of a transceiver at a remote location.

In reference to FIG. 6, at a step 604 one or more of the transceivers in the communication system may receive input from a user, network operator, or other source regarding system parameters. The system parameters may comprise any information regarding the type of hardware or components in the transmit or receive systems, including but not limited to the type of laser, the type of laser driver, the type of fiber, the length of fiber between the transmitter and the receiver, the type of optical detector, the number of slices, or any other property that may affect system operation or the optimal slice point of the actual installed system. The input may be programmed prior to installation based on the specifications for the final system or may be provided to the processor or memory via a user interface after install. For example, a data table may be uploaded to the system via the user interface based on in-lab measurements to account for changes to the communication system or updates to a data table. In this manner the slice point optimization may be dynamically changed over time. At a step 608 the processor stores these system parameters in memory for use during a communication session to optimize the slice point.

At a step 612 a first transceiver receives an incoming signal as part of normal communication operation from a second transceiver. For purposes of this discussion the first transceiver defined as receiving station while the second transceiver is defined as the sending stations. At a step 616 the incoming or received signal is monitored to determine the signal magnitude, such as a peak level, and further monitored at a step 620 for phase alignment or phase information. At step 624 the processor or other capable device at the first transceiver calculates the actual peak signal value and the actual phase alignment value for the incoming signal. Thereafter at a step 628 the operation performs a look-up or calculation to determine an optimal slice point and the operational parameters (settings) based on the measured signal characteristics and the system parameters input by a user or detected by the system itself. Stated another way, based on the signal characteristics and system configuration, such as system hardware characteristics, line length, received signal characteristics and age of the components the processor calculates or performs a table look-up to determine optimal system settings. In one embodiment this comprises determining, at step 628, operational parameters, such as transmit parameters that minimize the BER.

At a step 632 the processor identifies or generates optimal slice points and at step 640 the processor communicates the optimal slice point to the decision device. At step 644 the processor identifies or generates the system operational parameters that when combined with the optimal slice point, yield the minimum BER possible. These operational parameters may comprise transmit power settings and transmit phase alignment settings. Accordingly at step 648 the first transceiver establish a communication link with the second transceiver to exchange control information and, at step 652, transmits transmitter operational parameters to the second transceiver to control transmitter operation. In one embodiment a low frequency channel is utilized.

In this manner the transmit power and/or transmit signal phase may be adjusted which in turn may improve the BER, reduce power consumption, increase the life of the light emitting device in the transmitter, or allow for use of less expensive components in the second transceiver. It is contemplated that any operational parameter may be modified. Operation continues with these updated parameters and slice point and, at a step 660, the method for optimal slice point setting returns to step 612.

It is contemplated that these methods of signal monitoring may occur continuously during a communication session or occur intermittently or occur in response to user input via a user interface. It is also contemplated that the BER may be monitored by the processor and if the monitoring reveals that the BER is above a predefined level the slice point optimization routines described herein may be executed to redefine the slice to point to thereby reduce the BER.

Figure 7:
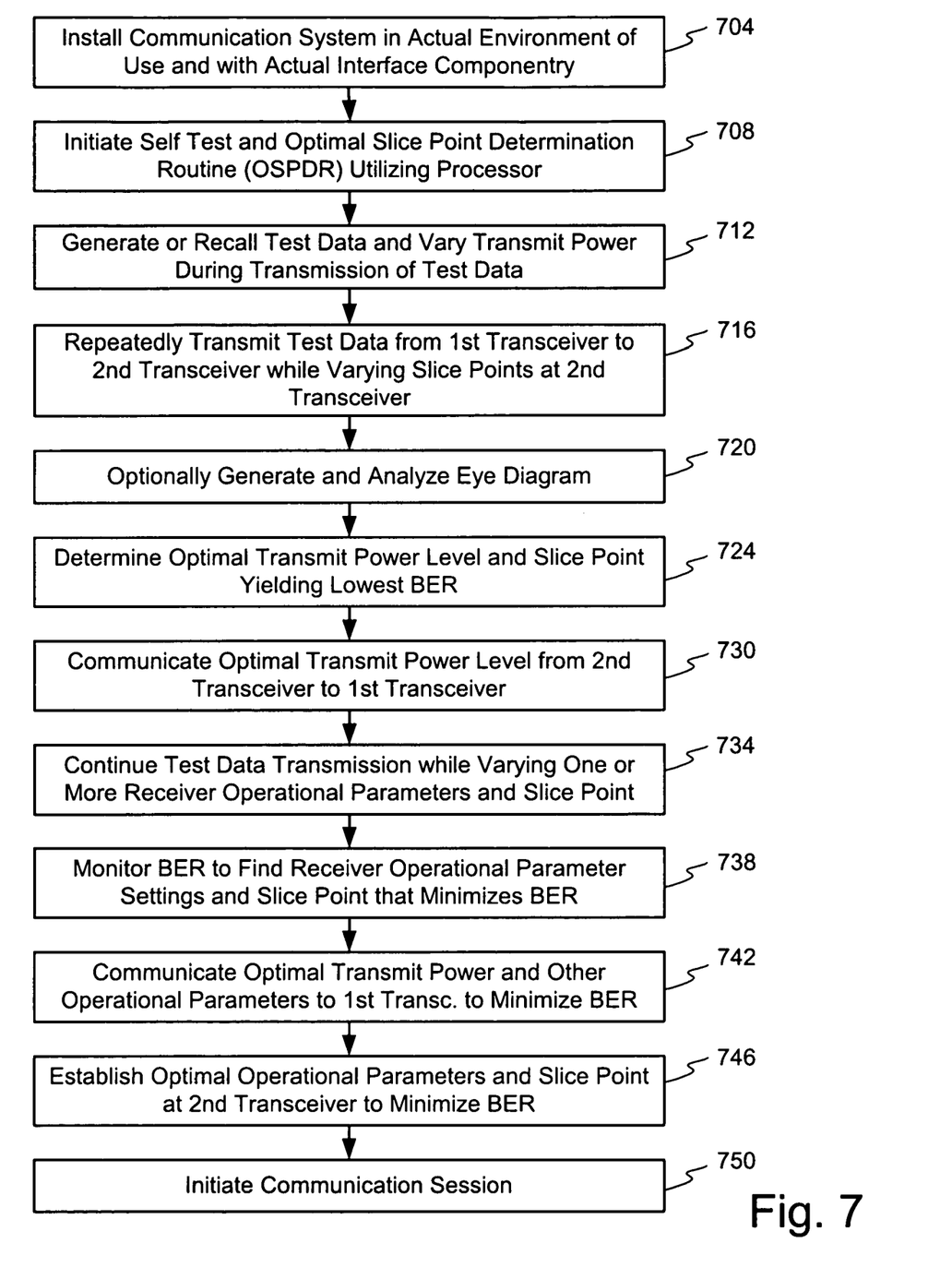
FIG. 7 illustrates an operation flow diagram of an example method of operation for a self test operation to determine an optimal slice point and operational parameters.

FIG. 7 illustrates an operation flow diagram of an example method of operation for a self test operation to determine an optimal slice point and operational parameters. It is contemplated that one or more transceivers in a communication system may include self test capability, such as that enabled by a built in self test (BIST) module. This enables a transceiver to generate, transmit, monitor and analyze one or more signals in conjunction with the actual communication system and related componentry as actually installed. It is contemplated that the BIST may be executed through use of hardware, software, or a combination of both.

At a step 704 it is contemplated that the communication system be installed in the actual environment of use and with actual communication componentry and transmission medium. Although not required, benefits may be realized by testing the actual installed system. At step 708 the processor or a user via a user interface initiates a self test and optimal slice point determination routine. As part of the self test routine the processor generates or recalls test data and varies one or more operational parameters, such as the transmit power, during transmission of the test data while concurrently monitoring the BER and adjusting the slice point. This may occur+ in a predetermined manner and it is contemplated that the transmitter and receiver may be operating in unison or in a known sequence during the self test. This process may repeat one or more times at step 716 and may be guided by a processor that is configured to oversee the self test operation. It is contemplated that that transmitter may send control signals to a transmitting station ($1^{st}$ transceiver) to vary transmit parameters, such as transmit power, transmit phase, transmit modulation level, or any other transmit parameter, while concurrently varying the slice point and monitoring the BER for particular slice points and combinations of operational parameters.

Thereafter, at step 720 the processor or other component may optionally draw or map the eye diagram for the particular test signals. From these mappings the optimal slice point may be ascertained, at step 724, and optionally stored in memory, for each of the numerous different operational characteristics. For example bit error contours may be generated as the power is ramped up and other operational parameters are varied or held constant. Alternatively, the optimum slice point can be determined based on data or mathematical analysis. At step 730 the processor in conjunction with a transmit and receive systems communicates the optimal transmit power level or optimal phase alignment from the receiving station ($2^{nd}$ transceiver), where the processing may be occurring, to the transmitting station ($1^{st}$ transceiver). Other aspects of transmitter operation may also be controlled including, but not limited to, transmit modulation level. It is contemplated that the transmit station operational parameters may be transmitted to the transmitting station in any manner.

At a step 734 the operation continues transmitting the test data while varying one or more receiving station operational parameters and the slice point. At a step 738 the testing may continue through the repeated transmission of signal at the specified transmitter operational parameters while varying the slice point and monitoring the BER for the particular receiving station operational parameters and the slice point setting that minimizes the BER. Data can be recorded regarding the BER at each operational parameter setting and each slice point. As can be understood numerous different operational parameters are systematically utilized during transmission of the test signal to determine which slice point yields the lowest BER for each set of different operational parameters. Alternative factors may also be monitored for such as for example, which operational parameters minimize transmit power and the BER.

At a step 742 the processor at the receiving station communicates the optimal slice point and optimal receiver station operational parameters to the decision device in the receiver station and other components of the receiver station. Thereafter at step 746 these settings are adopted by the decision device and the other components and at step 750 a communication session may be initiated between communication systems. It is contemplated that during this communication session the slice point and operational parameters determined during the BIST operation may be utilized.

As an advantage to this particular method of self-test and slice point optimization is that the testing and the determination of the optimal slice point occur on the actual communication system that is installed. Moreover, the optimum settings are arrived at in the actual environment of use. Thus any kinks, binds, or other line anomalies are accounted for, as are the actual performance characteristics of the components, such as the light emitting device and its associated driver. Yet another advantage is that the self-test for slice point optimization may be executed at any time the BER exceeds a desired level. By way of example, the performance of the fiber, connections, or light emitting source may change as each device ages. Through use of the self-test and optimal slice point determination routine the changes in performance may be accounted for and other parameters adjusted accordingly. In one particular situation the input power to a light source driver may be minimized when the system is new, but over time, as the system ages, the power provided to the driver may be increased to maintain a desired transmit power level and thereby minimize the BER.

It is further contemplated that the analysis to determine desired transmit power may reveal that a lower transmit power is optimal and as a result lower power transmit modules, such as the driver and light emitting devices, may be utilized. Use of lower power transmit modules may be less expensive, as compared to a high power module, which in turn may provide a competitive advantage to a purchaser or user.

In one example environment the method and apparatus described herein may be utilized in or in conjunction with physical media device or high speed multiplexer/de-multiplexers. When utilized in conjunction with processor-based control systems optimization is thereby possible to minimize the BER.

While various embodiments of the invention have been described, it will be apparent to those of ordinary skill in the art that many more embodiments and implementations are possible that are within the scope of this invention.

What is claimed is:

1. A method for reducing the bit error rate during reception and processing of a received signal comprising:
   receiving, at a receiver, a signal from a remote location;
   analyzing the received signal to determine one or more signal characteristics of the received signal;
   performing a look-up in a look-up table based on the one or more signal characteristics to determine an optimal slice point;
   retrieving optimal slice point data from the look-up;
   providing the optimal slice point data to a decision device that is part of the receiver to establish the optimal slice point as the decision device slice point; and
   processing the received signal with the decision device utilizing the optimal slice point.

2. The method of claim 1, wherein the one or more signal characteristics comprise a signal magnitude characteristic or a signal phase characteristic.

3. The method of claim 1, wherein the look-up table is generated during prior test routines to determine optimal slice points for a give set of one or more signal characteristics.

4. The method of claim 1, wherein the slice point comprises one or more threshold values that are utilized by the decision device.

5. The method of claim 1, wherein the decision device comprises a slicer.

6. The method of claim 1, wherein the relation between one or more signal characteristics and the optimal slice point is non-linear.

7. A method for quantizing a received signal to two or more discrete values comprising:
   monitoring a received signal to determine a peak value and phase value of the received signal;
   processing the peak value and phase value of the received signal based on prior testing to determine an optimal slice point;
   communicating the optimal slice point to a decision device;
   setting the slice point of the decision device to the optimal slice point; and
   analyzing the received signal with the decision device by comparing the received signal to the optimal slice point and, based on the comparison, quantizing the received signal to one of two or more discrete values.

8. The method of claim 7, wherein processing comprises performing a look-up operation in a memory.

9. The method of claim 7, wherein processing comprises executing one or more equations to determine an optimal slice point.

10. The method of claim 7, wherein comparing the received signal to the optimal slice point comprises comparing the magnitude of the received signal at a slice time to a threshold value defined by the optimal slice point.

11. The method of claim 7, wherein the received signal is received over a fiber optic cable.

12. The method of claim 7, wherein the processing comprises executing machine readable code to compare the peak value and phase value to one or more values in memory to obtain an optimal slice point.

13. A system for setting a slice point of a decision device in a transceiver comprising:
   an amplifier configured to modify a received signal's power level and output received signal strength indicator data representing the magnitude of the received signal;
   a clock and data recovery module configured to output phase alignment data regarding the received signal;
   a memory configured to store test data, the test data comprising optimal slice point data for two or more sets of signal strength indicator data and phase alignment data;
   a processor, in communication with the memory, configured to receive and utilize the signal strength indicator data and phase alignment data of the received signal to perform a look-up operation in the test data to determine an optimal slice point setting; and
   a decision device, in communication with the processor, configured to receive the optimal slice point setting and adjust one or more decision device threshold values based on the optimal slice point setting.

14. The system of claim 13, wherein the amplifier comprises a limiting amplifier.

15. The system of claim 13, wherein the optimal slice point data comprises at least a voltage threshold value.

16. The system of claim 13, wherein the test data comprises data that was generated prior to the look-up operation and the test data associates an optimal slice point with received signal strength value and phase alignment value.

17. The system of claim 13, wherein the relation between the optimal slice point is not linearly related to the received signal strength.

18. A method for controlling operation of one or more transceivers to reduce the bit error rate when processing a received signal comprising:
   receiving, at a receiver at a first station, a signal transmitted from a transmitter of a second station;
   analyzing the signal to determine one or more signal parameters;
   providing the one or more signal parameters to a processor;
   comparing the one or more signal parameters to optimal operational parameter data stored in a memory;
   responsive to the comparing, selecting one or more optimal operational parameter settings;
   transmitting at least one optimal operational parameter setting from the first station to the second station to control at least one aspect of operation of the transmitter at the second station; and
   continuing to receive and processing the signal, the signal being transmitted based on the optimal operational parameter settings, wherein the optimal operational parameter settings are selected to reduce the bit error rate during processing of the received signal.

19. The method of claim 18, further comprising communicating at least one optimal operational parameter setting to the receiver at the second station to control at least one aspect of processing the signal by the receiver at the first station.

20. The method of claim 18, wherein the signal is transmitted over a fiber optic medium.

21. The method of claim 18, wherein the operational parameters are selected from the group of operational parameters consisting of slice point voltage magnitude, slice point phase alignment, transmit power, transmit phase, modulation, bias, modulation percentage control, duty cycle control, or input compensation.

22. The method of claim 18, wherein transmitting utilizes a low frequency channel to communicate between the first station and the second station.

23. The method of claim 18, wherein transmitting at least one optimal operational parameter setting to the second station comprises transmitting an optimal transmit power level.

24. A method for determining one or more optimal slice point settings and operational parameter settings for communication between a first station and a second station comprising:
   providing a communication system having a receiver at a first station and a transmitter at a second station;
   initiating a test routine to determine one or more optimal slice points for a decision device located in the receiver of the first station, the test routine comprising:
      generating or retrieving from memory test data;
      transmitting the test data from the second station to the first station;
      monitoring the received signal to determine one or more received signal parameters;
      concurrent with transmitting the test data and monitoring the received signal, varying the slice point and monitoring the bit error rate to determine at least one optimal slice point;
      recording at least one optimal slice point for one or more permutations of transmit operational parameters and received signal parameters in a memory; and
   setting the optimal slice point and optimal transmit operational parameters.

25. The method of claim 24, further comprising varying one or more transmit operational parameters of the second station.

26. The method of claim 25, wherein setting the optimal transmit operational parameters comprises transmitting a control signal from the first station to the second station to thereby control the transmit power at the second station.

27. The method of claim 24, further comprising:
   initiating a communication session between the first station and the second station;
   receiving a signal from the second station;
   analyzing the signal to determine one or more received signal parameters;
   performing a look-up operation in the memory to obtain an optimal slice point for the determined one or more received signal parameters;
   communicating the optimal slice point to a decision device; and
   processing the received signal utilizing the optimal slice point for future processing by the decision device.

28. The method of claim 24, wherein the test routine is performed by a processor.

29. The method of claim 24, wherein the optimal slice point is dependant on a magnitude of the received signal and the one or more permutations of transmit operational parameters include varying the transmit power to thereby vary the magnitude of the received signal.

30. The method of claim 24, wherein the slice point is defined by a time value, a threshold voltage value, and a phase value.

31. The method of claim 24, wherein setting the optimal transmit operational parameters comprises transmitting a control signal from the first station to the second station to thereby control the transmit power at the second station.

32. A system for evaluating an installed communication link and establishing a optimal slice point based on the evaluation of the installed communication link comprising:
  a first station comprising:
    a driver circuit configured to establish a transmit power level based on a power level control signal;
    a first station processor configured to communication with a second station and the driver circuit to thereby provide a power level control signal to the driver circuit;
  a second station comprising:
    a signal magnitude detector configured to generate data regarding a magnitude level of a received signal;
    a decision device configured to quantize a received signal to one of two or more discrete values based on a slice point;
    a memory configured to store machine readable code;
    a second station processor configured to communicate with the first station, the decision device; and the signal peak detector to control a slice point of the decision device and the transmit power level at the first station, and further configured to:
      execute the machine readable code stored in the memory, the machine readable code configured to initiate a test routine that generates test data defining optimal slice points.

33. The system of claim 32, wherein the test data is generated by monitoring the error rate of the received signal during processing while varying the transmit power level and the slice point.

34. The system of claim 32, wherein the driver circuit is configured to drive a light emitting device.

35. The system of claim 32, wherein the machine readable code is further configured to set the optimal slice point of the decision device based on the test data to thereby minimize the error rate when processing a received signal.

36. The system of claim 32, wherein the second station processor monitors the error rate of a received signal and based on the monitoring alters the slice point of the decision device to reduce the error rate.

37. The system of claim 32, wherein the slice point is non-linearly related to the transmit power.

* * * * *